United States Patent
Antchak et al.

(10) Patent No.: US 9,651,099 B2
(45) Date of Patent: May 16, 2017

(54) CLUTCHED DEVICE WITH WRAP SPRING CLUTCH WITH OVERRUN LOCKING MEMBER

(71) Applicant: LITENS AUTOMOTIVE PARTNERSHIP, Woodbridge (CA)

(72) Inventors: John R. Antchak, Aurora (CA); Warren J. Williams, Oakville (CA)

(73) Assignee: LITENS AUTOMOTIVE PARTNERSHIP, Woodbridge, ON (CA)

( * ) Notice: Subject to any disclaimer, the term of this patent is extended or adjusted under 35 U.S.C. 154(b) by 131 days.

(21) Appl. No.: 14/760,162

(22) PCT Filed: Aug. 7, 2013

(86) PCT No.: PCT/CA2013/000691
§ 371 (c)(1),
(2) Date: Jul. 9, 2015

(87) PCT Pub. No.: WO2014/113862
PCT Pub. Date: Jul. 31, 2014

(65) Prior Publication Data
US 2015/0345575 A1    Dec. 3, 2015

Related U.S. Application Data

(60) Provisional application No. 61/756,896, filed on Jan. 25, 2013, provisional application No. 61/775,293, (Continued)

(51) Int. Cl.
*F16D 41/20* (2006.01)
*F16D 13/76* (2006.01)
(Continued)

(52) U.S. Cl.
CPC .......... *F16D 41/206* (2013.01); *F16D 13/76* (2013.01); *F16D 43/24* (2013.01); *F16H 55/36* (2013.01); *F16H 2055/366* (2013.01)

(58) Field of Classification Search
CPC .. F16H 55/36; F16H 2055/366; F16D 41/206; F16D 13/76; F16D 43/24
See application file for complete search history.

(56) References Cited

U.S. PATENT DOCUMENTS

| 6,083,130 A | 7/2000 | Mevissen et al. |
| 7,070,033 B2 | 7/2006 | Jansen et al. |

(Continued)

FOREIGN PATENT DOCUMENTS

| CA | 2802114 A1 | 12/2011 |
| WO | 2010048732 A1 | 5/2010 |

(Continued)

OTHER PUBLICATIONS

Search Report and Written Opinion for PCT/CA2013/000691, Oct. 21, 2013, ISA.

*Primary Examiner* — William E Dondero
*Assistant Examiner* — Robert T Reese
(74) *Attorney, Agent, or Firm* — Millman IP Inc.

(57) ABSTRACT

In an aspect, the invention is directed to a clutched device (such as, for example, a decoupler) that includes a clutch input member, a clutch output member, a wrap spring clutch. The wrap spring clutch has an overrun locking member thereon that is engageable with an overrun locking aperture in the output member so as to maintain a face at the helical end of the wrap spring clutch in engagement with a output member clutch drive face on the clutch output member.

9 Claims, 11 Drawing Sheets

Related U.S. Application Data filed on Mar. 8, 2013, provisional application No. 61/775,302, filed on Mar. 8, 2013.

(51) Int. Cl.
*F16H 55/36* (2006.01)
*F16D 43/24* (2006.01)

(56) References Cited

U.S. PATENT DOCUMENTS

| | | |
|---|---|---|
| 7,618,337 B2 | 11/2009 | Jansen et al. |
| 7,975,821 B2 | 7/2011 | Antchak et al. |
| 2006/0144664 A1* | 7/2006 | Antchak ............... F16D 41/206 192/41 S |
| 2013/0037370 A1* | 2/2013 | Marion .................. F16D 13/76 192/55.5 |
| 2014/0329631 A1* | 11/2014 | Mevissen ................ F02B 67/06 474/166 |
| 2015/0027844 A1* | 1/2015 | Serkh ...................... F16D 7/022 192/75 |
| 2015/0285365 A1* | 10/2015 | Canto Michelotti ... F16H 55/36 474/94 |

FOREIGN PATENT DOCUMENTS

| | | |
|---|---|---|
| WO | 2011160208 A1 | 12/2011 |
| WO | 2012061930 A1 | 5/2012 |
| WO | 2013131166 A1 | 9/2013 |

\* cited by examiner

CLUTCHED DEVICE WITH WRAP SPRING CLUTCH WITH OVERRUN LOCKING MEMBER

CROSS-REFERENCE TO RELATED APPLICATIONS

This application claims priority to U.S. Provisional Application No. 61/756,896, filed Jan. 25, 2013, U.S. Provisional Application No. 61/775,293, filed Mar. 8, 2013, and U.S. Provisional Application No. 61/775,302, filed Mar. 8, 2013, the entire contents of all of which are incorporated herein by reference.

FIELD OF THE DISCLOSURE

The present disclosure relates to decouplers and more particularly to a decoupler with a wrap spring clutch that is positioned on a carrier.

BACKGROUND

This section provides background information related to the present disclosure which is not necessarily prior art.

Examples of known decouplers are described in WIPO Publication Nos. WO 2004/070225 and WO 2005/028899. While such decouplers are satisfactory for their intended use, such decouplers are nonetheless susceptible to improvement.

SUMMARY

This section provides a general summary of the disclosure, and is not a comprehensive disclosure of its full scope or all of its features.

In an aspect, the invention is directed to a clutched device (such as, for example, a decoupler) that includes a clutch input member, a clutch output member, a wrap spring clutch. The wrap spring clutch has an overrun locking member thereon that is engageable with an overrun locking aperture in the output member so as to maintain a face at a helical end of the wrap spring clutch in engagement with a output member clutch drive face on the clutch output member.

In another aspect, the invention is directed to a clutched device, comprising, a clutch input member having a radially inner face, a clutch output member having a radially outer face, and a wrap spring clutch having a first helical end and a plurality of coils. The wrap spring clutch further includes an overrun locking member that is engageable with an overrun locking feature in the clutch output member. The clutched device is operable in a first mode wherein torque is transferred from the clutch input member into the wrap spring clutch and from a face at the first helical end of the wrap spring clutch into an output member clutch drive face on the clutch output member, and in a second mode wherein the clutch output device overruns the clutch input device. In the second mode, a first overrun drive surface on the overrun locking member engages a second overrun drive surface on the clutch output member which keeps the face at the first helical end of the wrap spring clutch substantially engaged with the output member clutch drive face on the clutch output member.

In another aspect, the invention is directed to the wrap spring clutch having an overrun locking member thereon.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
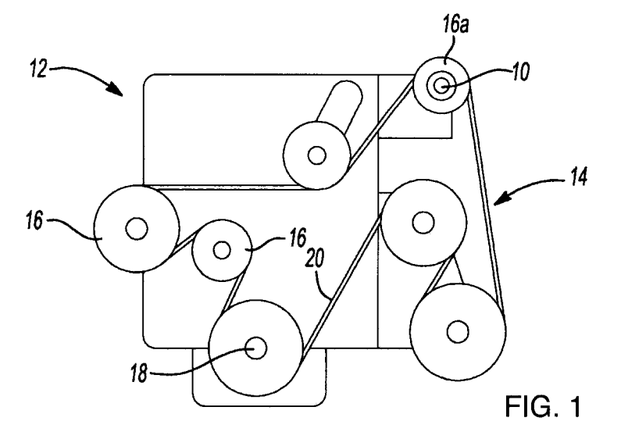
FIG. 1 is a schematic illustration in which a decoupler constructed in accordance with the teachings of the present disclosure is shown in operative association with an engine having a front accessory drive system.

With reference to FIG. 1 of the drawings, a decoupler constructed in accordance with the teachings of the present disclosure is generally indicated by reference numeral 10. The decoupler 10 is shown in operative association with an automotive engine 12 that can include an accessory drive system 14 having a plurality of engine accessories 16. In the particular example provided, the accessory drive system 14 is coupled to an output member (e.g., crankshaft) 18 of the engine 12. The accessory drive system 14 includes an endless power transmitting element 20, such as a belt, a chain or a plurality of gear teeth, that is configured to transmit rotary power from the engine output member 18 to input members, such as pulleys or sprockets, to drive the engine accessories 16. The decoupler 10 can be disposed between the endless power transmitting element 20 and one of the engine accessories (i.e., engine accessory 16a). It should be appreciated that while the decoupler 10 is illustrated in association with a front engine accessory drive, a decoupler constructed in accordance with the teachings of the present disclosure may be incorporated into various other devices in which a driven load is able at times to overspeed a source of rotary power.

Figure 2A:
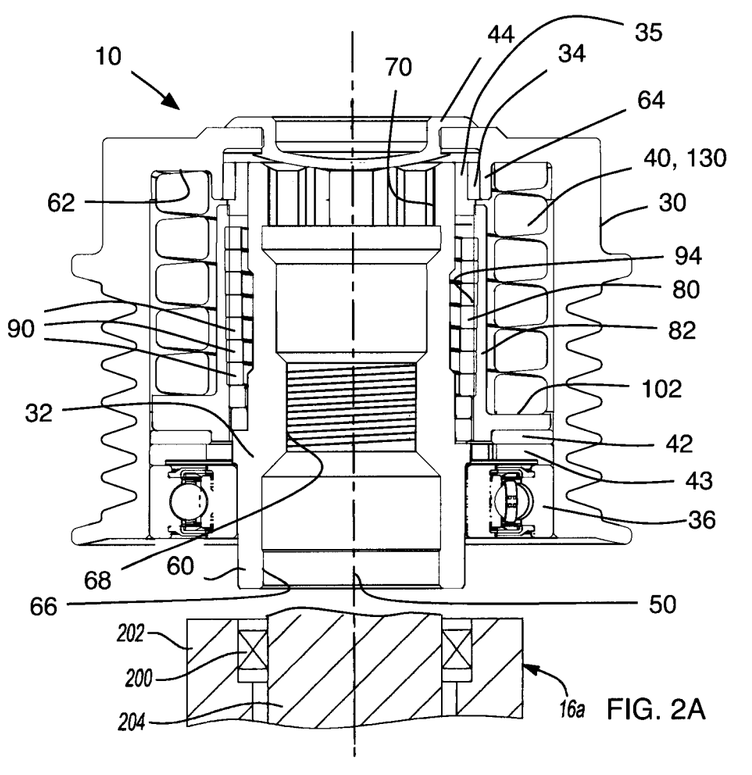
FIG. 2A is a longitudinal section view of the decoupler of FIG. 1.
Figure 2B:
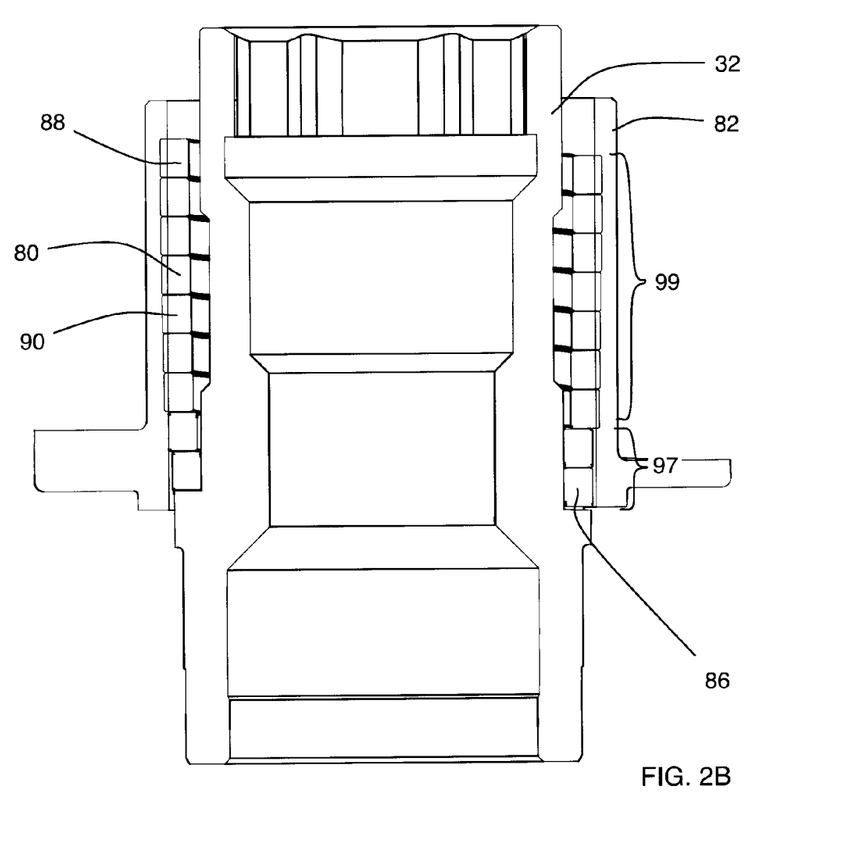
FIG. 2B is another longitudinal section view of a portion of the decoupler of FIG. 1.
Figure 3:
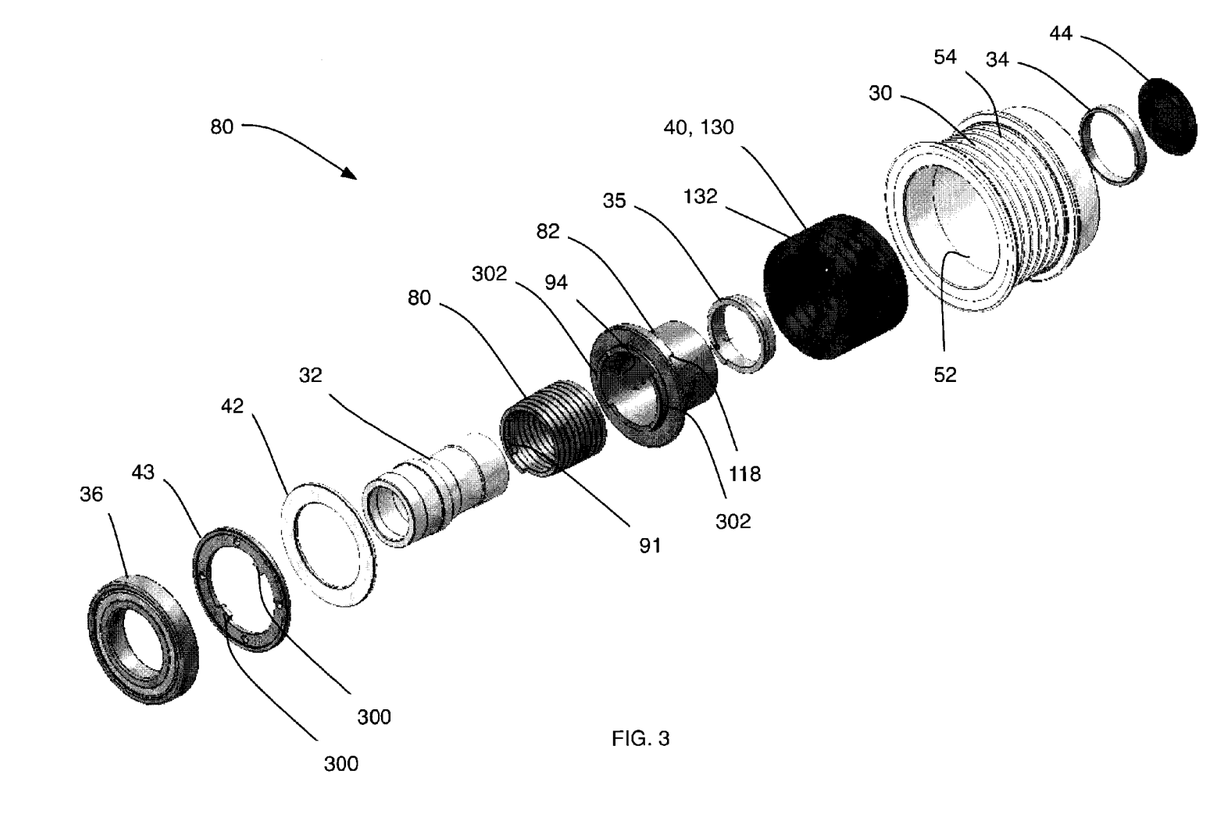
FIG. 3 is an exploded perspective view of the decoupler of FIG. 1.
Figure 4:
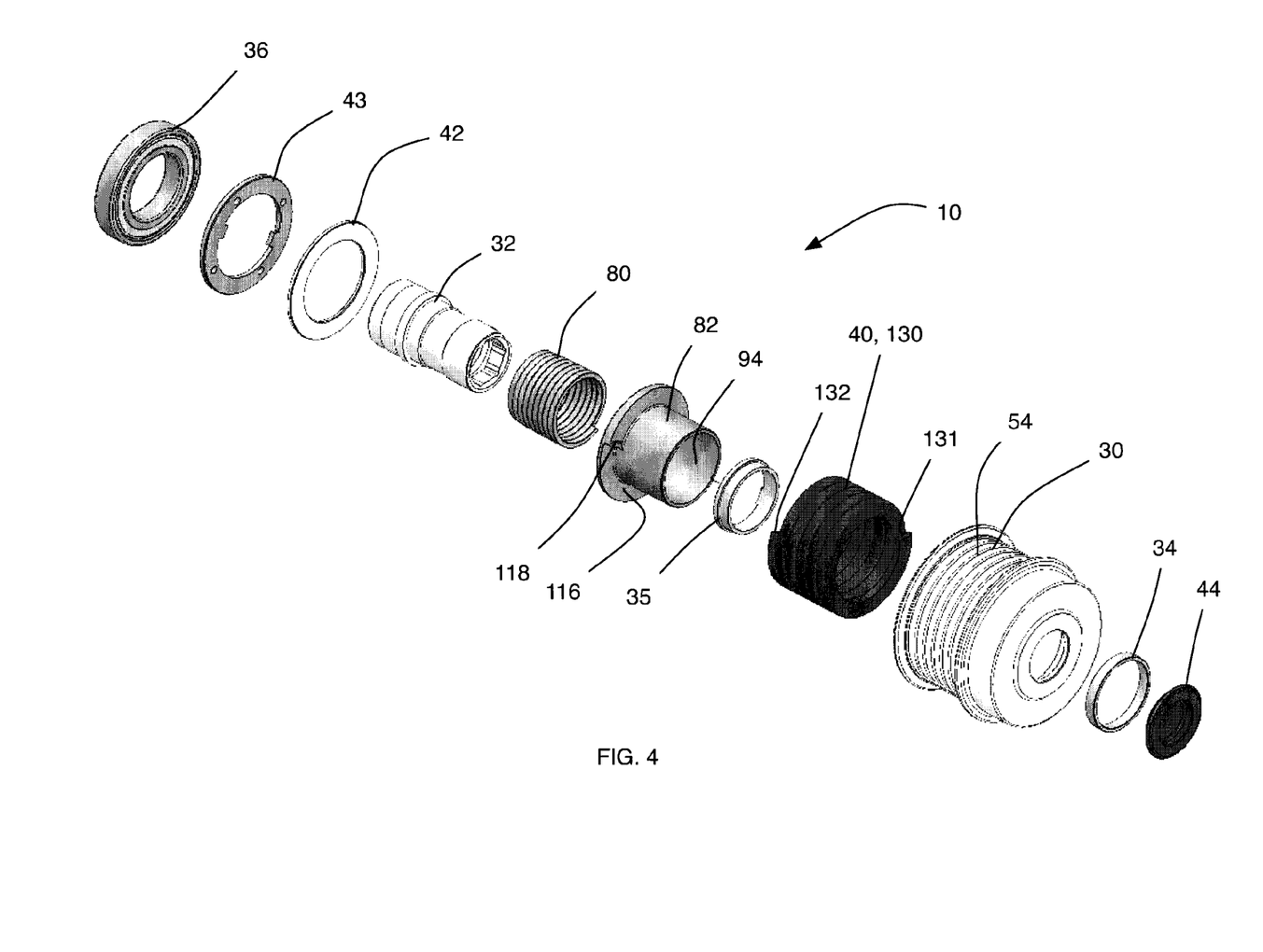
FIG. 4 is another exploded perspective view of the decoupler of FIG. 1.

With reference to FIGS. 2-4, the decoupler 10 can comprise a drive or input member 30, a driven or output member 32, a first bearing 34, a bearing retainer 35, a second bearing 36, a wrap spring clutch 80, a sleeve 82, a torsional isolation spring 40, a thrust washer 42, a thrust plate 43, and a front cover 44.

The input member 30 can comprise any type of structure that is configured to engage the endless power transmitting element 20 (FIG. 1) to receive power therefrom to rotate the input member 30 about a rotary axis 50 of the decoupler 10. In the particular example provided, the input member 30 is an annular structure (e.g. a pulley) that can define a central bore 52 and which can have a polyvee portion 54 that is configured to engage a conventional poly-vee serpentine belt.

Figure 5:
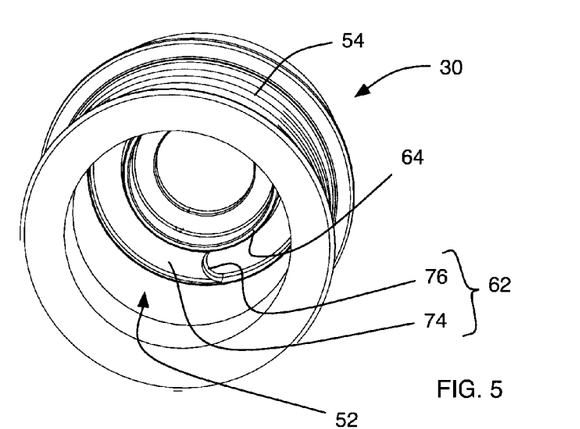
FIG. 5 is a perspective view of an input member from the decoupler of FIG. 1.

With reference to FIGS. 2-4, the output member 32 can be received in the central bore 52 in the input member 30 and can comprise a shaft-connection member 60 (which may be referred to as a hub 60), a first torsion spring ramp 62 (FIG. 5), and an annular collar 64. The hub 60 is connectable to an input shaft 204 of the engine accessory 16a (FIG. 2A). A bearing 200 is shown in the housing 202 of the engine accessory 16a that supports the input shaft 204 of the engine accessory 16a.

In the particular example provided, the hub 60 comprises a shaft-centering portion 66, a plurality of threads 68, and a tool-engaging portion 70. The shaft-centering portion 66 can comprise a low-tolerance (i.e., tightly-toleranced) bore that can be engaged to the input shaft 204 of the engine accessory 16a in a line-to-line fit (or tighter) manner to ensure that the rotary axis 50 of the decoupler 10 is aligned to the rotational axis of the input shaft 204. The threads 68 can be configured to threadably engage corresponding threads formed on the input shaft 204 of the engine accessory 16a. The tool-engaging portion 70 is conventionally constructed to receive a tool (not shown) that permits the hub 60 to be rotated relative to the input shaft 204 during installation of the decoupler 10 to the engine accessory 16a. The first isolation spring ramp 62 (FIG. 5) can be disposed about the circumference of the input member 30 and can include a first spring axial abutment surface 74, which can be shaped in a helical manner about the rotary axis 50, and a first spring drive face 76 that can extend generally perpendicular to the first spring abutment surface 74. The first abutment surface 74 engages a first axial end 107 of the isolation spring 40. The annular collar 64 can be coupled to a radially-outward end of the first torsion spring ramp 62 and can extend generally parallel to a portion of the hub 60. The annular collar 64 can be configured to receive thereon the first bearing 34, which can support the annular collar 64 for rotation in the central bore 52 relative to the input member 30. The annular collar 64 can also be configured to receive the front cover 44.

The second bearing 36 can be received on the hub 60 and may be engaged with the inside diametrical surface of the central bore 52 to support the output member 32 for rotation relative to the input member 30. The first and second bearings 34 and 36 can be any type of bearing, including a rolling-element bearing, a journal bearing or a bushing. In the particular example provided, the first bearing 34 is a plastic bushing that is supported on the bearing retainer 35 (which is press fit onto the output member 32), while the second bearing 36 is a sealed ball bearing that is mounted on a low-tolerance (i.e., tightly toleranced) portion of the outside diametrical surface of the hub 60.

The torsional isolation spring 40, the sleeve 82 and the wrap spring clutch 80 can be disposed serially in a load path between the input member 30 and the output member 32. For example, the torsional isolation spring 40, the sleeve 82, and the wrap spring clutch may be configured to operate in a first mode in which rotary power is transmitted in a first rotational direction from the input member 30 through the isolation spring 40, in turn through the sleeve 82, in turn through the wrap spring clutch 80 and into the output member 32, and a second mode in which the output member 32 overruns the input member 30 in the first rotational direction.

As shown in FIG. 2A, the isolation spring 40 is positioned outboard of the wrap spring clutch 80.

With reference to FIGS. 2-4, the isolation spring 40 can be any type of device that can provide torsional compliance between the input member 30 and the spring sleeve 82, such as one or more mechanical springs or resilient spring-like members. In the particular example provided, the isolation spring 40 comprises a helical torsion spring that is formed of a spring-steel wire and wound in a direction opposite the direction in which the wrap spring clutch 80 is wound. The isolation spring 40 has first and second faces 131 and 132 (FIGS. 4 and 3 respectively) at respective helical ends of the isolation spring 40 that are disposed generally perpendicular to the helically extending longitudinal axis of the wire that forms the torsion spring 130. The first face 131 is abutted against the first spring drive face 76 on the input member 30, while the second face 132 is abutted against the second spring drive face 118 (FIG. 6) on the sleeve 82.

Figure 7:
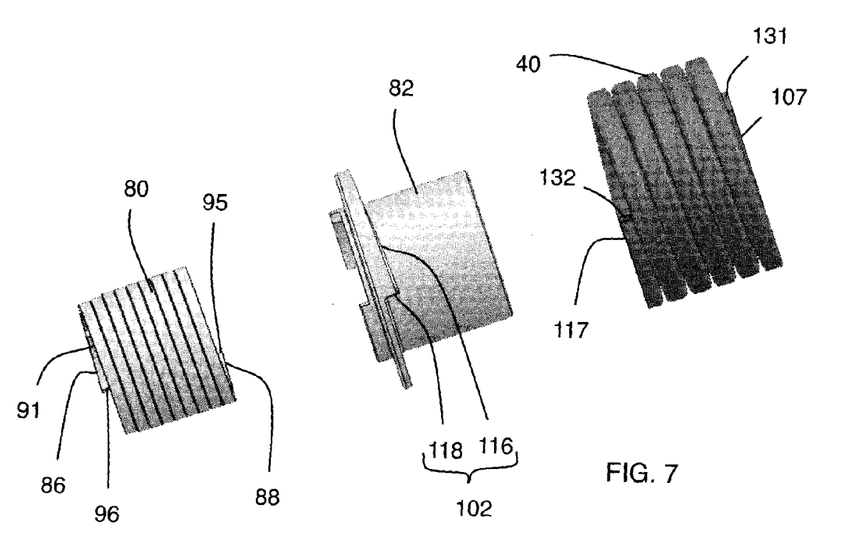
FIG. 7 is a side view of an isolation spring, a sleeve and the wrap spring clutch from the decoupler of FIG. 1.

With reference to FIG. 7, the spring sleeve 82 can comprise a second isolation spring ramp 102. The second torsion spring ramp 102 includes a second spring abutment surface 116, which can be shaped in a helical manner about the rotary axis 50, and a second spring drive face 118 (which may also be referred to as an isolation spring drive face 118) that can extend generally perpendicularly to the second spring abutment surface 116. The second spring abutment surface 116 engages a second axial end 117 of the isolation spring 40.

The axial position of the spring sleeve 82 is selected to cooperate with the input member 30 to provide a selected amount of compression in the isolation spring 40.

The spring sleeve 82 further includes a clutch driving surface 94 (FIGS. 2-4) which is a radially inner surface of the sleeve 82. When the decoupler 10 operates in the first mode, the clutch driving surface 94 engages the radially outer surface of a plurality of the coils 90 of the wrap spring clutch 80.

The spring sleeve 82 can be formed from an appropriate steel material, such as a high-strength, low alloy steel that is strong and suitable for forming the sleeve 82 via stamping. The sleeve 82 can be configured to transmit force from the second end 132 of the isolation spring 40 to the wrap spring clutch 80.

The wrap spring clutch 80 can be formed of an appropriate spring steel wire with a desired cross-sectional shape, such as a square or rectangular cross-sectional shape. Referring to FIG. 7, the wrap spring clutch 80 can have a first helical end 86, a second end 88 and a plurality of helical coils 90 disposed axially between the first and second ends 86 and 88. The helical coils 90 can be sized to engage the radial clutch drive surface 94 (FIG. 3) on the sleeve 82. The first helical end 86 can terminate at a face 96 (FIGS. 6A and 6B) that can be formed generally perpendicular to the longitudinal axis of the wire that forms the wrap spring clutch 80.

The output member 32 may include a wrap spring clutch ramp 100 configured to engage the wrap spring clutch 80 and can comprise a wrap spring clutch abutment surface 106 and a output member clutch drive face 108. The wrap spring clutch abutment surface 106 can be shaped in a helical manner and configured to abut a first axial end 110 of the wrap spring clutch 80. The clutch drive face 108 can extend generally perpendicularly to the wrap spring clutch abutment surface 106 and can engage the face 96 at the first helical end 86 of the wrap spring clutch 80. The clutch 80 further includes a face 95 at a second helical end.

With reference to FIGS. 2, 5, 6A and 6B, the helical coils 90 gather rotary power from the input member 30 during operation of the decoupler 10 (via contact between the helical coils 90 and the radial clutch drive surface 94) that is transmitted axially along the wire that forms the wrap spring clutch 80 such that at least a portion of the rotary power is transmitted through the face 96 at the first helical end 86 to the clutch drive face 108 on the carrier member 120. The rotary power input to the carrier member 120 is output via the second spring drive face 118 to the torsion spring 130, which transmits the rotary power to the output member 32 (via the first spring drive face 76).

With reference to FIG. 2A, the wrap spring clutch 80 can be sized to contact the radial clutch drive surface 94 in an interference fit or press fit manner. For example, the wrap spring clutch 80 can be sized and shaped in a generally cylindrical manner such that, in its rest state, the outside diameter of the wrap spring clutch 80 is larger than the diameter of the radial clutch drive surface 94. This is illustrated in FIG. 2A by showing the outer diameter of coils 90 of the wrap spring clutch 80 exceeding the inner diameter of the radial clutch drive surface 94.

The wrap spring clutch 80 may be tapered as shown in FIG. 2A such that a first portion 97 (FIG. 2B) proximate the first helical end 86 is sized to not have an interference relationship with the radial clutch drive surface 94 and wherein the outer diameter of the coils 90 progressively increases away from the first helical end 86, such that a second portion 99 (FIG. 2B) of the wrap spring clutch 80 is sized progressively larger in diameter so that a portion of the helical coils 90 are sized larger in outer diameter than the radial clutch drive surface 94. Construction in this manner configures the wrap spring clutch 80 in a self-energizing manner in which the coils 90 of the wrap spring clutch 80 tend to expand radially outwardly to thereby more securely engage the radial clutch drive surface 94 when load is transmitted through the wrap spring clutch 80.

The thrust plate 43 is positioned axially behind the sleeve 82 and is press fit in the input member 30 so as to be fixedly positioned relative thereto. The thrust plate 43 sets the axial position for the sleeve 82, which determines the amount of axial compression there is in the isolation spring 40. The thrust washer 42 is a polymeric member that is positioned between the thrust plate 43 and the sleeve 82 to prevent metal-on-metal contact therebetween and to facilitate some amount of relative rotational movement therebetween during decoupler operation.

When the decoupler 10 is at rest, there is a constrictive force applied by the first portion 97 of the wrap spring clutch 80 on the output member 32 that locks the wrap spring clutch 80 rotationally with the decoupler. When the decoupler 10 is operating in the first mode, torque is passed from the input member 30, into the first face 131 on the isolation spring 40, through the isolation spring 40, into the sleeve 82 from the second face 132 of the isolation spring 82, through the sleeve 82 into the wrap spring clutch 80 via engagement of the radial clutch drive surface 94 with the radially outer surface of the wrap spring clutch 80, through the wrap spring clutch 80 and finally from the face 96 at the first helical end 86 of the wrap spring clutch 80 into the output member 32. In an embodiment, the first portion 97 includes about one coil 90 of the wrap spring clutch 80.

When in the first mode, the force of the sleeve 82 on the wrap spring clutch 80 and the consequent reaction force of the output member 32 on the wrap spring clutch 80 urge the wrap spring clutch 80 to expand radially, which assists in locking the wrap spring clutch 80 with the radial clutch drive surface 94. Centripetal forces resulting from the rotation of the decoupler 10 further urge the wrap spring clutch 80 to expand radially. As a result, depending on the torque transfer and the rotational speeds involved, the constrictive force of the first portion 97 of the wrap spring clutch 80 on the output member 32 may reduce significantly, potentially to approximately zero. While the torque transfer is in a direction from the input member 30 to the output member 32, the wrap spring clutch 80 remains rotationally fixed with the output member 32 in any case. In the event however, of a deceleration of the input member (e.g. due to torsional vibration or some transient event) the output member 32 can overrun the input member 30, in which case the wrap spring clutch 80 no longer applies a driving force on the output member 32, and the radial clutch drive surface 94 no longer applies a driving force urging the wrap spring clutch 80 to expand radially. As a result the second portion 99 of the wrap spring clutch 80 remains engaged with the radial clutch drive surface 94 due to its interference fit therewith, but the first portion 97 of the wrap spring clutch 80 contracts radially so reapply a constrictive force on the output member 32 in the event that the constrictive force was, in the first mode, reduced to substantially zero. Once the constrictive force is reapplied, the wrap spring clutch 80 becomes rotationally locked again with the output member 32. However, during the transition between the first and second modes of operation, there is a moment where the wrap spring clutch has not yet contracted sufficiently to reapply the constrictive force, in situations, for example, where there are very high rotational speeds and very abrupt reductions in torque involved. In such a situation, if there were nothing else to lock the wrap spring clutch 80 with the output member 32, the wrap spring clutch 80 could momentarily lose its rotational locking with the output member 32, which could cause a separation of the face 96 with the drive face 108. When the input member 30 returns to a state where it overruns the output member 32, a torque is reapplied to the wrap spring clutch 80 driving the first helical end 86 forward into engagement with the drive surface 108 which can result in an impact therebetween and a resultant stress on the first helical end 86 of the wrap spring clutch 80, which can, over time, fatigue the first helical end 86 of the wrap spring clutch 80 and thereby reduce its operating life.

Figure 6A:
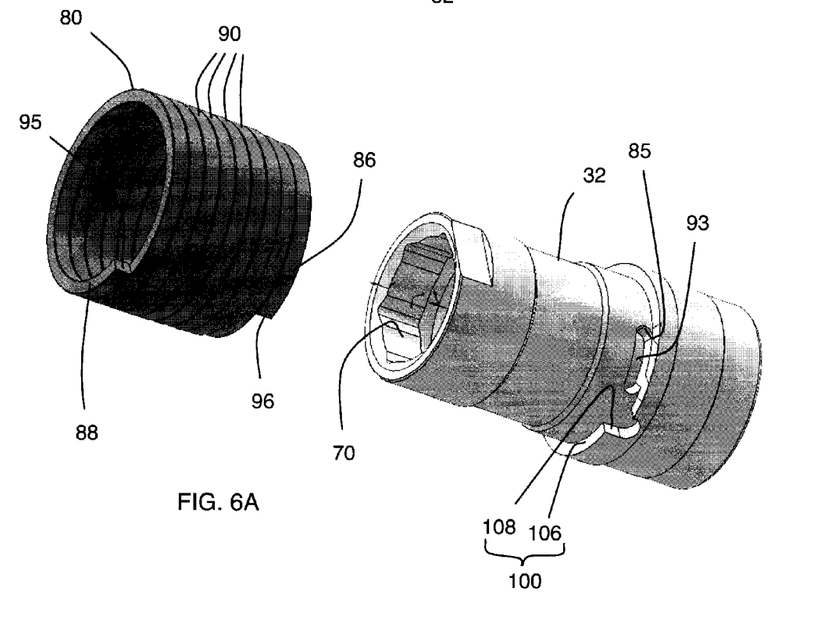
FIGS. 6A and 6B are perspective exploded views of a wrap spring clutch and an output member from the decoupler of FIG. 1.
Figure 6B:
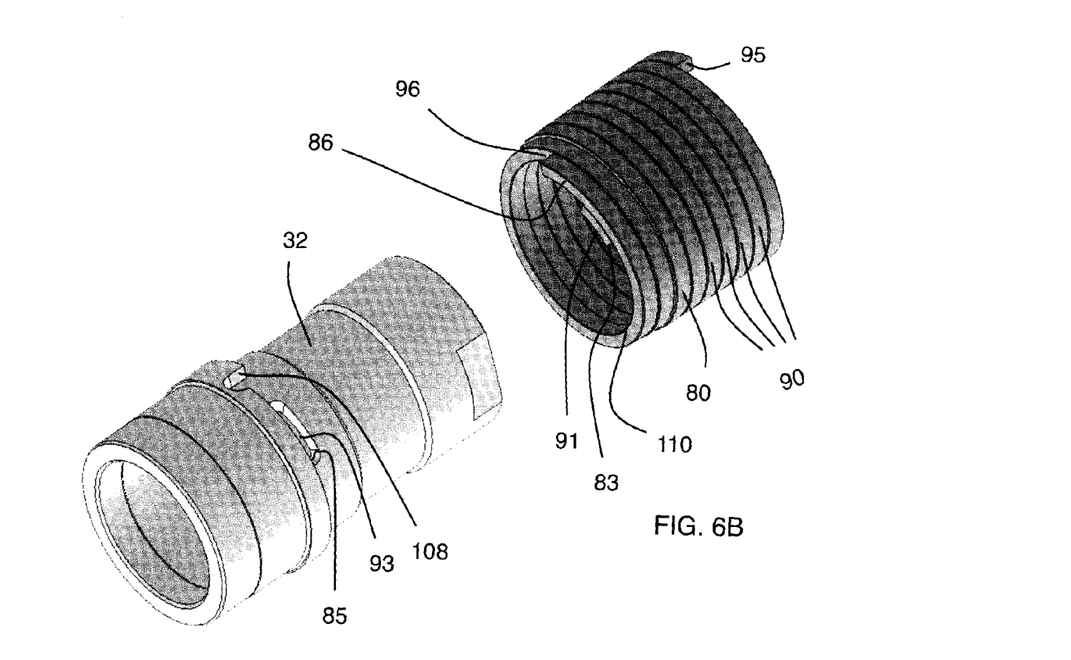

To ensure that the wrap spring clutch 80 remains rotationally fixed with the output member 32, an overrun locking member 91 may be provided on the wrap spring clutch 80 as shown in FIG. 6B. The overrun locking member 91 engages an overrun locking feature (e.g. an aperture 93) that is provided on the output member 32. When received in the aperture 93, a first overrun drive face 83 on the overrun locking member 91 is engaged with a second overrun drive face 85 on the output member 32 (specifically, in the aperture 93). The overrun locking feature 91 may be a small arcuate section of the same wire that the wrap spring clutch 80 is made from, which is welded to the radially inner surface of the first coil 90 of the wrap spring clutch 80. When the decoupler 10 is operated in a second mode, in which the output member 32 overruns the input member 30 the engagement of the first overrun drive face 83 with the second overrun drive face 85, the first helical end 86 of the wrap spring clutch 80 remains rotationally fixed with the output member 32, thereby keeping the face 96 on the wrap spring clutch 80 substantially engaged with the drive face 108.

It will be noted that, when the decoupler 10 operates in the first mode, the torque being transferred between the wrap spring clutch 80 and the output member 32 may be in the range of about 30 Nm, for example. By contrast, when operating in the second mode, the torque being applied between the drive faces 83 and 85 may be in the range of about 2 to about 4 Nm. As a result, the stresses incurred by the joint between the first coil 90 and the overrun locking member 97 are well below a level that risks failure of the joint.

While the overrun locking member 91 may be welded to the first coil 90 of the wrap spring clutch 80 it is alternatively possible to join the overrun locking member 91 in any other suitable way to the first coil 90.

For ease of assembly, there may be some clearance provided between the overrun locking member 91 and the overrun locking aperture 93. As a result of this clearance, there may be some small amount of rotational movement between the output member 32 and the wrap spring clutch 80 when the output member 32 overruns the input member 30, resulting in a very small separation between the drive face 108 and the face 96 on the wrap spring clutch 80. This small separation, however, is not sufficient to result in large impact forces between the face 96 and the drive face 108 when the decoupler 10 returns to the first mode of operation. Thus, even though the small separation may exist during an overrun event, the face 96 may still be considered to be substantially engaged with the drive face 108.

In addition to locking the wrap spring clutch 80 rotationally with the output member 32, the overrun locking member 91 and the overrun locking aperture 93 may cooperate to fix the wrap spring clutch 80 axially with the output member 32, so as to inhibit the first helical end 86 of the wrap spring clutch 80 from lifting axially away from the drive face 108 during operation.

A pair of first anti-ramp members 300 may be provided on the thrust plate 43 and may cooperate with second anti-ramp members 302 on the sleeve 82 to limit the amount of relative rotation that can occur between the sleeve 82 and the input member 30 during an overrun event, so as to limit the amount of axial compression that can be exerted on the isolation spring 40 during such an event. More specifically, as described above, the isolation spring 40 is engaged with first and second helical abutment surfaces 74 and 116. During an overrun event, due to the continued frictional engagement between the sleeve 82 and the wrap spring clutch 80, the sleeve 82 will be urged to rotate along with the wrap spring clutch 80 and the output member 32, relative to the input member 30. As such rotation occurs, the abutment surfaces 74 and 116 can cooperate to compress the isolation spring 72. If this compression is excessive the isolation spring 40 could lock up entirely. The anti-ramp members 300 and 302 limit how much the sleeve 82 can move relative to the input member 30, thereby limiting the relative movement of the abutment surfaces 74 and 116, which, in turn limits the amount of compression that can occur in the isolation spring 82.

Figure 8:
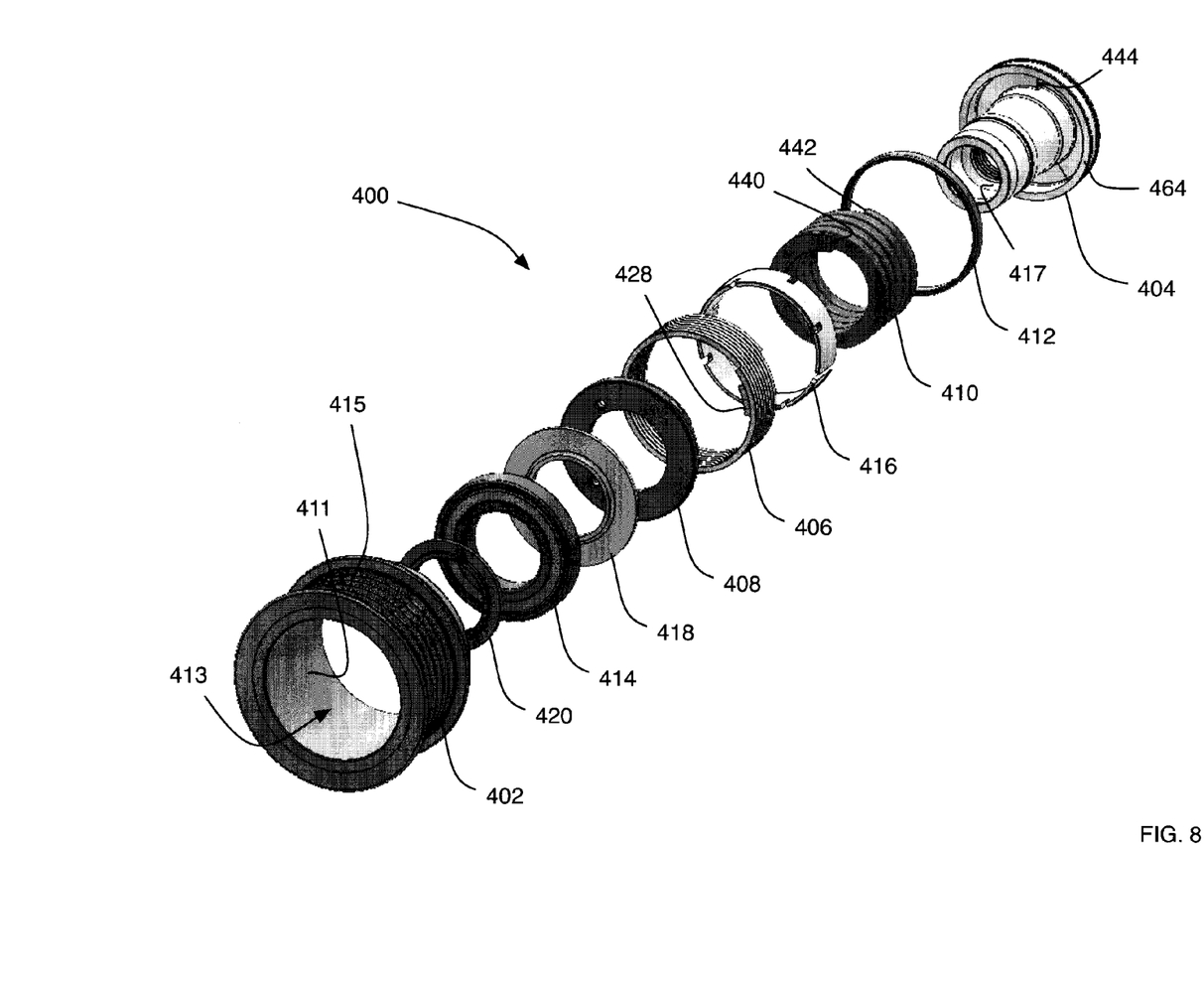
FIG. 8 is an exploded perspective view of a decoupler in accordance with another embodiment of the present disclosure.
Figure 9:
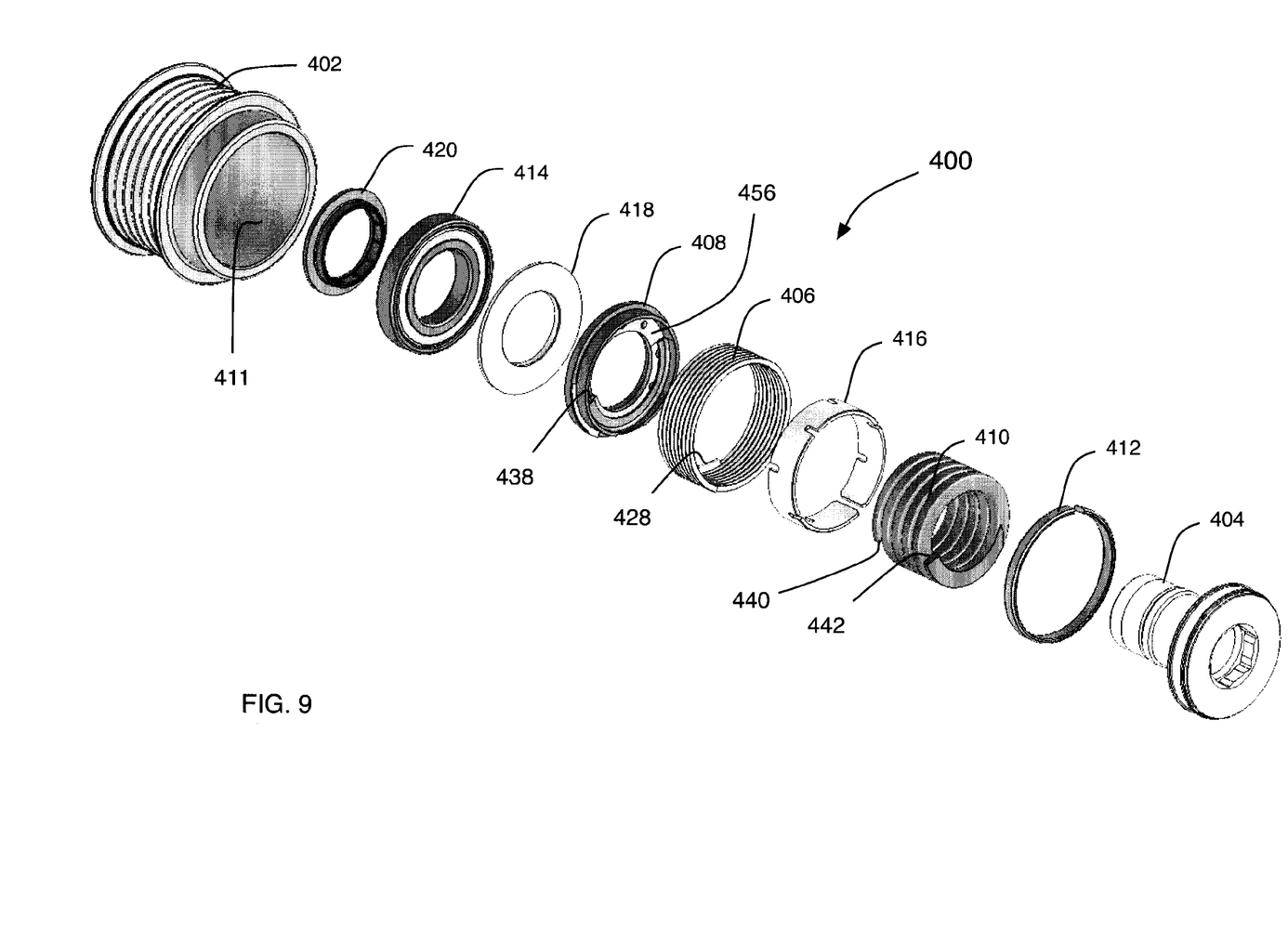
FIG. 9 is another exploded perspective view of the decoupler shown in FIG. 8.

Reference is made to FIGS. 8-14 which show a decoupler 400 in accordance with another embodiment of the present invention. Referring to FIGS. 8 and 9, the decoupler 400, which may be similar to the decoupler 10, includes an input member 402, an output member 404, a wrap spring clutch 406, a carrier 408 and an isolation spring 410 (e.g. a helical torsion spring), a first bearing 412 (which may be a bushing) and a second bearing 414 (which may be a ball bearing) for rotatably supporting the input member 402 on the output member 404. A sleeve 416 is provided between the isolation spring 410 and the wrap spring clutch 406, and limits the amount of torque that can be transmitted through the isolation spring 410 by limiting the amount of radial expansion that is available to the spring 410. A thrust plate 418 is provided between the bearing 414 and the carrier 408. A bearing shield 420 is provided which may be similar to bearing shield 48.

Figure 10:
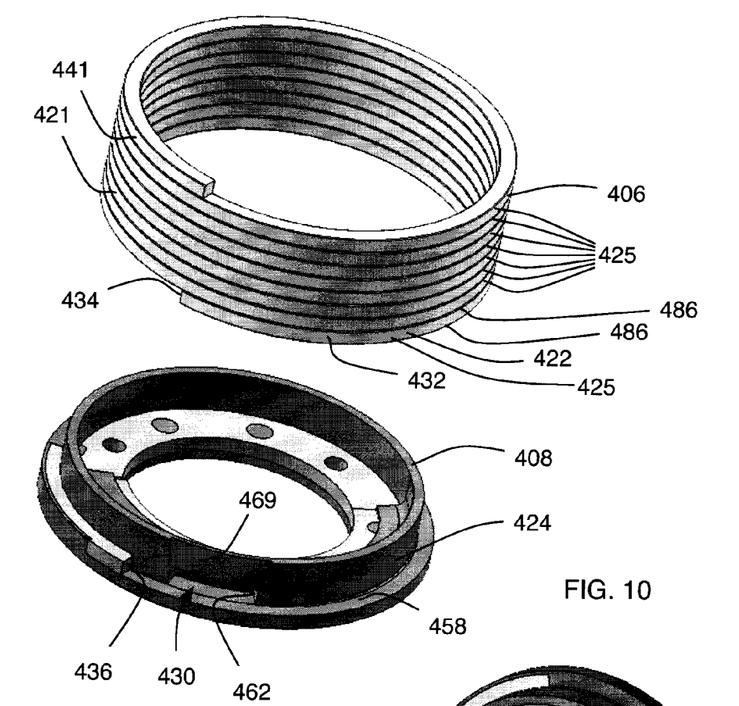
FIG. 10 is an exploded perspective view of a wrap spring clutch and a carrier from the decoupler shown in FIG. 8.
Figure 13:
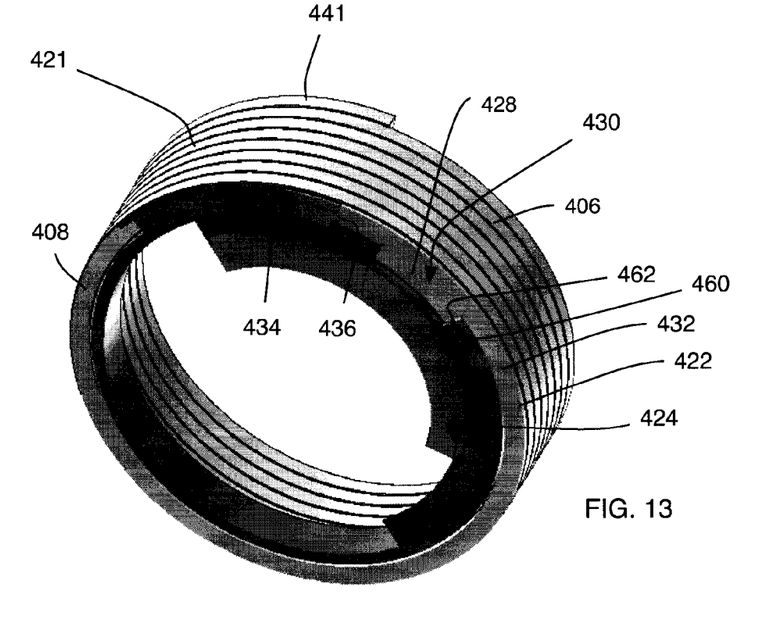
FIG. 13 is a sectional perspective view along section lines 13-13 in FIG. 12.

Torque is transferred from the input member 402 to the output member 404 serially through the wrap spring clutch 406, the carrier 408, and the isolation spring 410, optionally in that order. Driving of the wrap spring clutch 406 by the input member 402 may be by engagement of a clutch drive surface 411 on the input member 402 with the radially outer surface 421 of the wrap spring clutch 406. The clutch drive surface 411 may also be referred to as a radial clutch drive surface 411. Referring to FIGS. 10 and 13, a first helical end 432 of the wrap spring clutch 406 has a first helical end 434 that is engaged with a carrier clutch drive face 436 on the carrier 408. A second end of the wrap spring clutch 406 is shown at 441, wherein a second helical end 443 is located. Referring to FIGS. 9 and 10, the carrier 408 further includes an isolation spring drive face 438 that is engaged with a face 440 at a helical end (FIG. 9) of the isolation spring 410. A face 442 at the other helical end of the isolation spring 410 is engaged with another isolation spring drive face 444 on the output member 402. The face 442 on the isolation spring may be referred to as a face 442 at a first helical end of the isolation spring 410. The face 440 on the isolation spring 410 may be referred to as a face 440 at a second helical end of the isolation spring 410. The drive face 444 may be referred to as the first isolation spring drive face and the drive face 438 may be referred to as a second isolation spring drive face.

Figure 11:
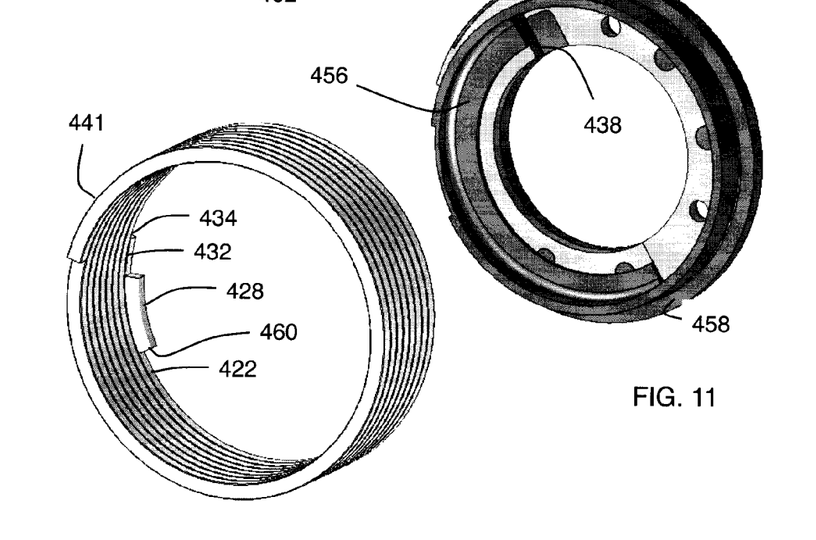
FIG. 11 is another exploded perspective view of the wrap spring clutch and carrier from the decoupler shown in FIG. 8.
Figure 12:
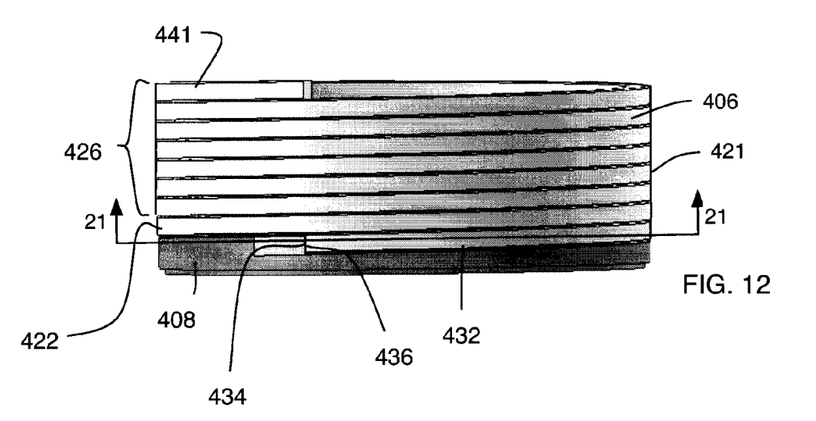
FIG. 12 is a side view of the wrap spring clutch and carrier mounted together.

Instead of having a wrap spring clutch that is bonded or welded or otherwise fixedly joined to a carrier, the decoupler 400 has its wrap spring clutch 406 rotationally fixed to the carrier 408 by several features. Referring to FIG. 11, one such feature is that a first portion 422 towards the first helical end 432 of the wrap spring clutch 406 is configured to have an inner diameter at rest that is smaller than the outer diameter of a clutch grip surface 424 on the carrier 408. In an embodiment, the first portion 422 includes about one coil 425 of the wrap spring clutch 406. A second portion 426 has an inner diameter that is larger than that of the first portion 422. As a result, when the wrap spring clutch 406 is mounted to the carrier 408 there is an interference fit which causes the wrap spring clutch 406 to maintain a grip on carrier 408 even when the second portion 426 is expanded and grips the clutch drive surface 411. The coils that make up the second portion 426 do not have an interference fit with the clutch grip surface 424 and may have an outer diameter that is larger than the inner diameter of the clutch drive surface 411 on the input member 402 (FIG. 16) so as to have an interference fit therewith.

Another feature that rotationally fixes the wrap spring clutch 406 to the carrier 408 is an overrun locking member 428 shown in FIG. 11 that is engaged with an overrun locking feature (e.g. an aperture 430 shown in FIG. 10) on the carrier 408. When received in the aperture 430, a first overrun drive face 460 is engaged with a second overrun drive face 462. The overrun locking feature 428 may be a small arcuate section of the same wire that the wrap spring clutch 406 is made from, which is welded to the radially inner surface of the first coil 422 of the wrap spring clutch 406. When the decoupler 400 is operated in a second mode, in which the output member 404 overruns the input member 402, the output member 404 rotates in the first rotational direction relative to the input member 402. This second mode can, for example, arise by a deceleration of the input member 402 relative to the output member 404 (e.g. a momentary deceleration due to a torsional vibration).

In a situation where the rotational speed of the decoupler 10 is sufficiently high it has been found that, upon a transition from the first mode to the second mode, there is a moment during which the first portion of the wrap spring clutch 406 may not apply a constrictive force on the carrier 408. During such a moment, if there were no other structure to keep the wrap spring clutch 406 rotationally fixed with the carrier 408 the carrier 408 could rotate relative to the wrap spring clutch 406, resulting in a separation of the drive face 436 from the face 434 at the helical end 432. When the decoupler 400 would return to the first mode, the wrap spring clutch 406 would then be driven by the input member 402 until the face 434 impacted into the drive face 436, which can result in stress and ultimately failure of the wrap spring clutch 406 or the carrier 408.

Referring to FIG. 13, because of the engagement of the first overrun drive face 460 with the second overrun drive face 462 the face 434 at the helical end 432 is kept substantially in engagement with the drive face 436 on the carrier 408. It will be noted that there may be a small amount of clearance between the overrun locking member 428 and the overrun locking aperture 430, permitting a small amount of relative movement of the carrier 408 from the wrap spring clutch 406, however, even with such clearance, the face 434 at the helical end 432 of the wrap spring clutch 406 may still be considered substantially engaged with drive face 436 on the carrier 408 even though there may be a very small spacing between them. Routine experimentation may be used to determine a suitable spacing that can still be considered substantial engagement between the face 434 at the helical end 432 and the drive face 436. In at least some embodiments, the clearance may be less than about a millimeter.

Referring to FIG. 10, in order to facilitate the engagement of the assembly of the wrap spring clutch 406 with the carrier 408, the carrier 408 may include a lead in section 469 that is tapered relative to the grip surface 424. Additionally, the lead in section serves to provide an indicator as to how to rotationally align the wrap spring clutch 406 with the carrier 408 when assembling the two together.

Figure 14:
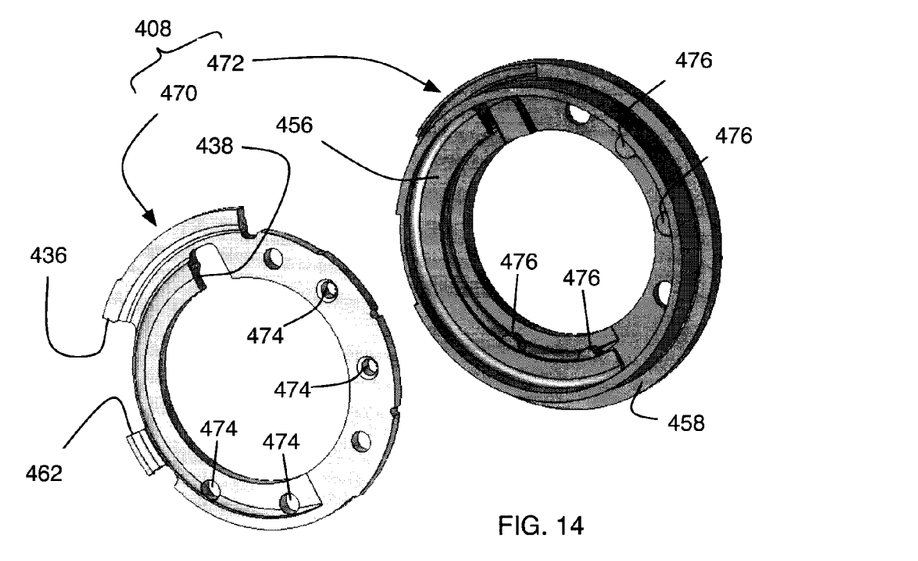
FIG. 14 is an exploded view of the carrier shown in 10.

Referring to FIG. 14, the carrier 408 may be formed from two members, namely a core member 470 that may be made from a first, relatively strong and hard material such as a suitable metal, such as a suitable steel, and a cover member 472 made from a second, relatively softer material such as a suitable polymeric material, such as a suitable nylon. The core member 470 defines at least a portion of the drive faces 436, 438 and 462. The cover member 472 is provided to reduce noise during engagement of the wrap spring clutch 406 with the carrier 408 and during engagement of the isolation spring 410 and the carrier 408. A helical ramp 456 which engages an axial end of the isolation spring 410 and a helical ramp 458 which engages a first axial end of the wrap spring clutch 406 are provided on the cover member 472. The cover member 472 may be formed by an overmolding process on the core member 470. Locking apertures 474 and locking bosses 476 may be provided on the core member 470 and cover member 472 respectively to assist in securing the cover member 472 to the core member 470.

For greater certainty, while the input member 30, 402 has been shown as being a belt-driven pulley and the output member 32, 404 has been shown to be a shaft-connection member that connects to a shaft of an accessory, it will be understood that the decoupler could be configured such that the input member could be a shaft-connection member for connection to a shaft (e.g. a crankshaft from an engine) and the output member could be a pulley that drives a belt or the like.

While the wrap spring clutch 80, 406 has been described as having a first portion that applies a constrictive force on the sleeve 82 or on the carrier 408, and a second portion that has an interference fit with the clutch drive surface 94, 411, it will be understood that the second portion of the wrap spring clutch 80, 406 may have a larger diameter than the first portion, but may not have a diameter large enough to provide an interference fit with the clutch drive surface.

In the embodiment shown in FIGS. 2-7, the wrap spring clutch 80 acts between the sleeve 82 and the output member 32. The sleeve 82 may thus be considered to be the clutch input member, whereas the input member 30 may be considered to be the decoupler input member. The output member 32 may be considered to be the clutch output member and may also be considered to be the decoupler output member. In the embodiment shown in FIGS. 8-14, the wrap spring clutch 406 acts between the input member 402 and the carrier 408. The input member 402 may thus be considered to be the clutch input member, and may also be considered to be the decoupler input member. The carrier 408 may be considered to be the clutch output member.

It will be noted that the above described embodiments permit the first helical end 86, 432 of the wrap spring clutch 80, 406 to remain rotationally fixed with the clutch output member, without the need to bend the first helical end 86, 432, i.e. while keeping the first helical end 86, 432 substantially helical. This is advantageous in that any bends in the wire of the wrap spring clutch 86, 432 weaken the clutch 86, 432 thereby potentially shortening its operating life. The embodiments shown and described above permit the use of a first helical end 86, 432 that is substantially helical.

While a decoupler 10, 400 has been shown to benefit from the overrun locking member on the wrap spring clutch, other types of clutched device may also benefit.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A clutched device, comprising:
a clutch input member (82, 402) having a radially inner face (94, 411);

a clutch output member (32, 408) having a radially outer face (424); and a wrap spring clutch (80, 406) having a first helical end (86, 432) and a plurality of coils (90, 425), wherein the clutch further includes an overrun locking member (91, 428), wherein the clutched device is operable in a first mode wherein torque is transferred from the clutch input member into the wrap spring clutch and from a face (96, 434) at the first helical end of the wrap spring clutch into an output member clutch drive face (108, 436) on the clutch output member, and in a second mode wherein the clutch output device overruns the clutch input device, wherein, in the second mode, a first overrun drive surface (83, 460) on the overrun locking member (91, 428) engages a second overrun drive surface (85, 462) on the clutch output member which keeps the face at the first helical end of the wrap spring clutch substantially engaged with the output member clutch drive face on the clutch output member.

2. A clutched device as claimed in claim 1, wherein a first portion (97, 422) of the wrap spring clutch is sized smaller in diameter than a second portion (99, 426) of the wrap spring clutch, wherein the first portion of the wrap spring clutch includes the first helical end and is engaged in an interference fit with the clutch output member.

3. A clutched device as claimed in claim 2, wherein the second portion of the wrap spring clutch is engaged in an interference fit with the clutch input member.

4. A clutched device as claimed in claim 1, wherein the clutch output member is a carrier.

5. A clutched device as claimed in claim 4, wherein the clutched device is a decoupler that further comprises an isolation spring positioned to receive a torque from the carrier and to transfer the torque to a decoupler output member.

6. A clutched device as claimed in claim 5, wherein the clutch input member is a pulley and the decoupler output member is a shaft connection member.

7. A clutched device as claimed in claim 1, wherein the clutch input member is a sleeve.

8. A clutched device as claimed in claim 7, wherein the clutched device is a decoupler that further comprises an isolation spring positioned to receive a torque from a decoupler input member and to transfer the torque to the sleeve.

9. A clutched device as claimed in claim 8, wherein the decoupler input member is a pulley and the clutch output member is a shaft connection member.

* * * * *